US011685312B2

(12) United States Patent
Iino et al.

(10) Patent No.: US 11,685,312 B2
(45) Date of Patent: Jun. 27, 2023

(54) DISPLAY CONTROL DEVICE, DISPLAY DEVICE, AND DISPLAY CONTROL PROGRAM PRODUCT FOR SUPERIMPOSING AN EMPHASIZED IMAGE ITEM

(71) Applicants: DENSO CORPORATION, Kariya (JP); TOYOTA JIDOSHA KABUSHIKI KAISHA, Toyota (JP)

(72) Inventors: Masahiro Iino, Kariya (JP); Michihiro Takada, Kariya (JP); Mayuko Maeda, Kariya (JP); Yasutaka Matsunaga, Toyota (JP); Toshihiro Takagi, Toyota (JP); Takuya Nakagawa, Toyota (JP); Yuki Minase, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/498,734

(22) Filed: Oct. 11, 2021

(65) Prior Publication Data
US 2022/0111793 A1    Apr. 14, 2022

(30) Foreign Application Priority Data
Oct. 14, 2020    (JP) .................................. 2020-173441

(51) Int. Cl.
*B60R 1/00*    (2022.01)
*G06T 11/00*    (2006.01)
(Continued)

(52) U.S. Cl.
CPC .............. *B60R 1/00* (2013.01); *G06T 11/001* (2013.01); *G06T 11/203* (2013.01); *G08G 1/143* (2013.01); *H04N 5/272* (2013.01); *B60R 2300/10* (2013.01); *B60R 2300/304* (2013.01); *B60R 2300/806* (2013.01); *G06T 2210/62* (2013.01)

(58) Field of Classification Search
CPC ................ B60R 1/00; B60R 2300/304; B60R 2300/806; G06T 11/001; G06T 11/203; G06T 2210/62; G08G 1/143; H04N 5/272
See application file for complete search history.

(56) References Cited

U.S. PATENT DOCUMENTS

| 2007/0100543 | A1* | 5/2007 | Kato | B62D 15/027 |
| | | | | 340/932.2 |
| 2009/0118900 | A1* | 5/2009 | Adachi | B62D 15/027 |
| | | | | 701/1 |

(Continued)

*Primary Examiner* — Terrell M Robinson
(74) *Attorney, Agent, or Firm* — Maschoff Brennan

(57) ABSTRACT

A display control device mounted on a vehicle having a parking support function controls a display to display a rear image captured by a rear camera. The display control device acquires the rear image captured by the rear camera; and superimposes, in response to the parking support function being activated, a target image item indicating a target parking position at a predetermined position of the rear image which corresponds to the target parking position. The display control device superimposes at least a part of the target image item in translucent manner on the rear image, and superimpose, on the rear image, an emphasized image item that emphasizes at least four corners of the target image item.

10 Claims, 10 Drawing Sheets

(51) Int. Cl.
*H04N 5/272* (2006.01)
*G06T 11/20* (2006.01)
*G08G 1/14* (2006.01)

(56) References Cited

U.S. PATENT DOCUMENTS

| | | |
|---|---|---|
| 2009/0251334 A1 | 10/2009 | Yoshihashi et al. |
| 2011/0181724 A1* | 7/2011 | Kadowaki ................. B60R 1/00 348/148 |
| 2011/0273310 A1 | 11/2011 | Kadowaki et al. |
| 2011/0304477 A1 | 12/2011 | Yoshihashi et al. |
| 2014/0055487 A1* | 2/2014 | Kiyo ......................... B60R 1/00 345/629 |
| 2016/0075375 A1* | 3/2016 | Yamashita ........... B62D 15/028 701/41 |

* cited by examiner

DISPLAY CONTROL DEVICE, DISPLAY DEVICE, AND DISPLAY CONTROL PROGRAM PRODUCT FOR SUPERIMPOSING AN EMPHASIZED IMAGE ITEM

CROSS REFERENCE TO RELATED APPLICATION

The present application claims the benefit of priority from Japanese Patent Application No. 2020-173441 filed on Oct. 14, 2020. The entire disclosure of the above application is incorporated herein by reference.

TECHNICAL FIELD

The present disclosure relates to a display control device, a display device, and a display control program product each of which displays rear images captured by a rear camera.

BACKGROUND

Conventionally, a vehicle display device that displays a target parking frame in a rear image captured by a rear camera has been known.

SUMMARY

The present disclosure provides a display control device. The display control device is mounted on a vehicle installed with a parking support function, and controls a display mounted on the vehicle to display a rear image captured by a rear camera. The display control device acquires the rear image captured by the rear camera; and superimposes, in response to the parking support function that supports parking of the vehicle at a target parking position being activated, a target image item indicating the target parking position at a predetermined position of the rear image which corresponds to the target parking position. The target image item has a frame shape or a planner shape. The display control device is configured to: superimpose at least a part of the target image item in translucent manner on the rear image; and superimpose, on the rear image, an emphasized image item that emphasizes at least four corners of the target image item. The present disclosure also provides a display device and a display control program product corresponding to the above display control device.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
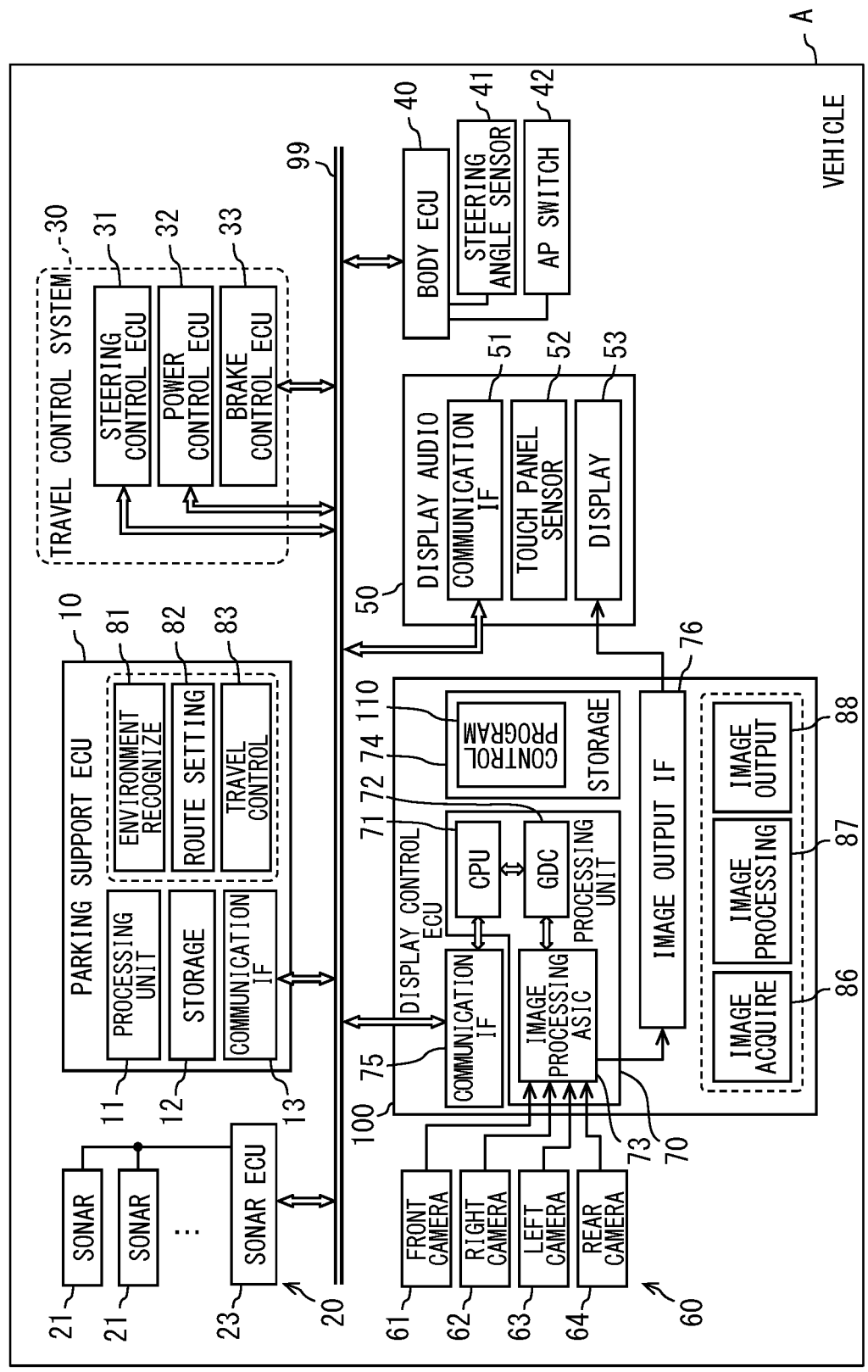
FIG. 1 is a diagram showing a configuration of an in-vehicle network including a display control ECU according to an embodiment of the present disclosure.

Before describing embodiments of the present disclosure, a known display control device will be described.

There has been known a parking support device that guides a vehicle to a target parking position as a parking support. In this parking support device, a target parking frame is superimposed and displayed on a vehicle's rear area image, which is captured by a rear camera and displayed on a touch display. The target parking frame is displayed in translucent manner so that the rear area image of the vehicle can be visually recognized even when the target parking frame is superimposed on the rear area image.

For example, in order to satisfy requirements of the KT (Kids and Transportation Safety Act) law in the United States, it is effective to display the target parking frame in translucent manner to ensure a visibility of the rear area image of the vehicle. However, when the target parking frame is displayed in translucent manner, a visibility of the target parking frame itself is reduced. As a result, depending on a state of the vehicle's rear area image, it becomes difficult to find the target parking frame from the vehicle rear area image, and it may adversely affect the convenience of the user who parks the vehicle by visually checking the vehicle's rear area image.

According to a first aspect of the present disclosure, a display control device mounted on a vehicle installed with a parking support function is provided. The display control device controls a display mounted on the vehicle to display a rear image captured by a rear camera. The rear camera captures a rear area of the vehicle. The display control device includes: an image acquisition unit acquiring the rear image captured by the rear camera; and an image processing unit superimposing, in response to the parking support function that supports parking of the vehicle at a target parking position being activated, a target image item indicating the target parking position at a predetermined position of the rear image which corresponds to the target parking position. The target image item has a frame shape or a planner shape. The image processing unit is configured to: superimpose at least a part of the target image item in translucent manner on the rear image; and superimpose, on the rear image, an emphasized image item that emphasizes at least four corners of the target image item.

According to a second aspect of the present disclosure, a display device mounted on a vehicle installed with a parking support function is provided. The display device displays a rear image captured by a rear camera. The rear camera captures a rear area of the vehicle. The display device includes: an image acquisition unit acquiring the rear image captured by the rear camera; an image processing unit superimposing, in response to the parking support function that supports parking of the vehicle at a target parking position being activated, a target image item indicating the target parking position at a predetermined position of the rear image which corresponds to the target parking position, the target image item having a frame shape or a planner shape; and a display displays the rear image on which the target image item is superimposed. The image processing unit is configured to: superimpose at least a part of the target image item in translucent manner on the rear image; and superimpose, on the rear image, an emphasized image item that emphasizes at least four corners of the target image item.

According to a third aspect of the present disclosure, a display control program product used in a vehicle installed with a parking support function is provided. The display control program product is stored in a computer-readable non-transitory tangible storage medium as instructions to be executed by at least one processing unit to control a display mounted on the vehicle to display a rear image captured by a rear camera. The instructions includes: acquiring the rear image captured by the rear camera; and in response to the parking support function that supports parking of the vehicle at a target parking position being activated, superimposing a target image item and an emphasized image item on the rear image. The target image item indicates the target parking position with a frame shape or a planner shape. The target image item is superimposed on the rear image at a position corresponding to the target parking position, and at least a part of the target image item is superimposed in translucent manner on the rear image. The emphasized image item emphasizes at least four corners of the target image item.

In the configurations of the above-described aspects, the four corners of the frame-shaped or planar-shaped target image item indicating the target parking position are displayed in emphasized manner by the emphasized image item. When the target image item is superimposed on the rear image in translucent manner, the visibility of the target image item is low. According to the above configurations, even though the target image item is superimposed on the rear image in translucent manner, the emphasized image item displayed in the rear image RV enables the driver to easily find the target image item. Therefore, the convenience of the user who visually recognizes the rear image can be improved.

Figure 2:
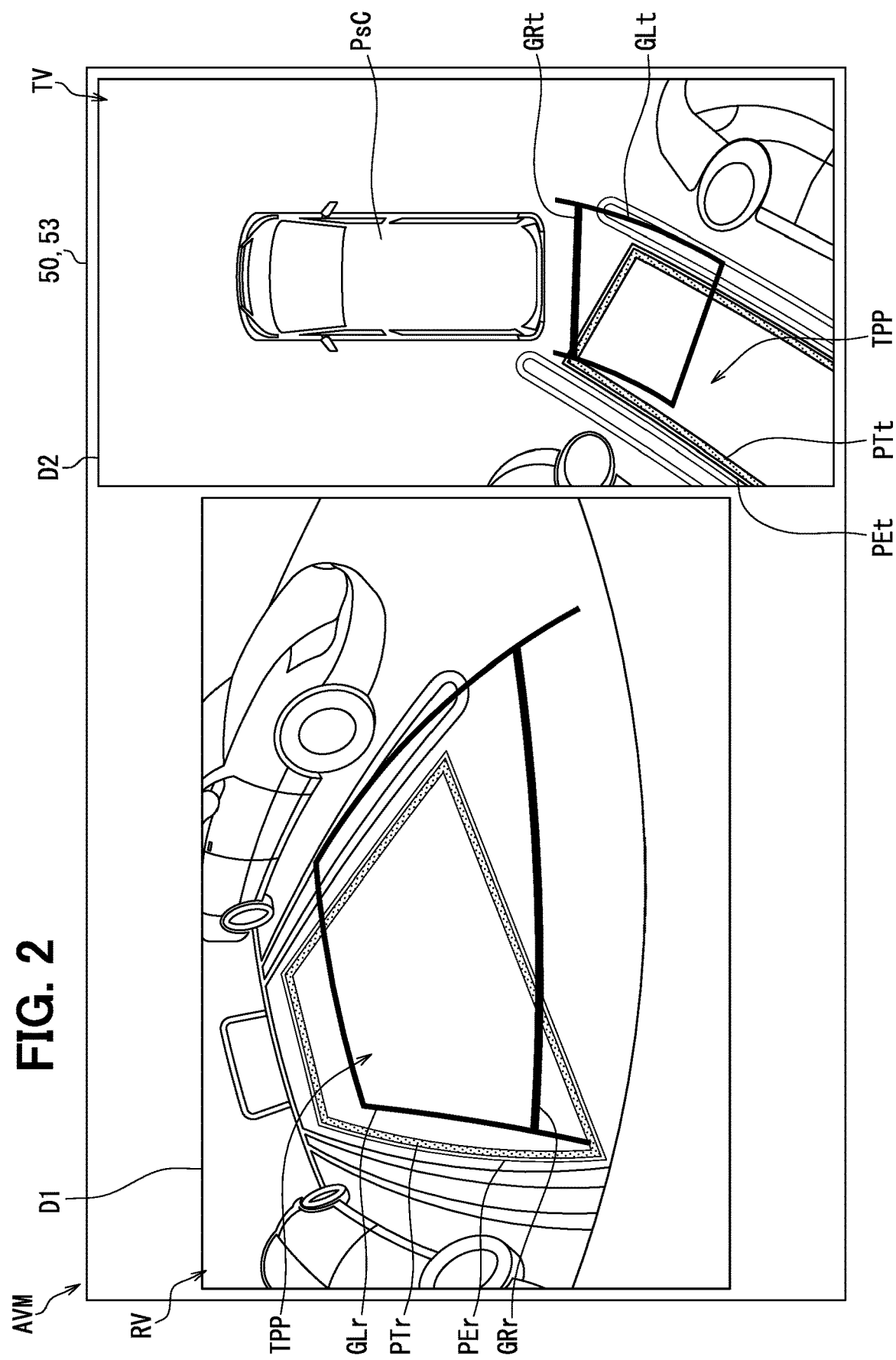
FIG. 2 is a diagram showing an example of a peripheral monitoring image displayed on a display device.

Function of a display control device according to an embodiment of the present disclosure is implemented by a display control electronic control unit (ECU) 100 shown in FIG. 1. The display control ECU 100 is mounted on a vehicle A, and has a display control function for outputting image data to a display device mounted on the vehicle A. The display control ECU 100 controls the display device mounted on the vehicle A to display a peripheral monitoring image AVM as shown in FIG. 2. The peripheral monitoring image is one of multiple display contents displayed by the display device.

The display control ECU 100 shown in FIG. 1 is communicably connected to a communication bus 99 of an in-vehicle network mounted on the vehicle A. A parking support ECU 10, a sonar system 20, a travelling control system 30, a body ECU 40, a display audio 50, a camera system 60, and the like are connected to the communication bus 99 of the in-vehicle network. These nodes connected to the communication bus 99 can communicate with one another. It should be noted that specific nodes among the multiple devices and the multiple ECUs may be directly electrically connected with one another and can communicate with one other without using the communication bus 99.

The parking support ECU 10 provides a parking support function that supports a driver's driving operation for parking the vehicle A. Hereinafter, the driver's driving operation for parking the vehicle is referred to as parking operation. By installing the parking support ECU 10, the vehicle A has the parking support function. When using the parking support function, the driver is obliged to monitor the surroundings of the vehicle. The parking support ECU 10 may perform an automatic parking for the driver as a parking operation in which the driver is not required to monitor the surroundings of the vehicle.

The parking support ECU 10 mainly includes a computer including a processing unit 11, a storage 12, a communication interface (IF) 13, and the like. The processing unit 11 includes at least one arithmetic core such as a central processing unit (CPU). The processing unit 11 is electrically connected to the RAM. By accessing to the RAM, the processing unit 11 executes various processes for providing the parking support function. The storage 12 includes a non-volatile storage medium. Various programs including parking support programs to be executed by the processing unit 11 are stored in the storage 12. The communication interface 13 is electrically connected to the communication bus 99, and communicates information necessary for providing the parking support function with the communication bus 99.

The parking support ECU 10 receives, by the communication interface 13, detection information output from an autonomous sensor group including the sonar system 20 and the camera system 60, and recognizes a travelling environment around the own vehicle. The parking support ECU 10 acquires a travelling state of the own vehicle based on vehicle information output from other sensor devices to the communication bus 99. The parking support ECU 10 generates a control command for instructing the travelling, stop, steering, etc. of the own vehicle based on the detection information and the vehicle information. The parking support ECU 10 provides the generated control command to each ECU of the travelling control system 30 through the communication interface 13 and the communication bus 99. As described above, the parking support ECU 10 cooperates with the travelling control system 30 to support the parking operation of the driver. The specific operation of the parking support function will be described later.

The sonar system 20 includes multiple sonar sensors 21 and a sonar ECU 23. The sonar sensors 21 are embedded in front and rear bumpers of the vehicle A at intervals from each other. Each sonar sensor 21 emits ultrasonic waves toward a periphery of the vehicle A, and receives ultrasonic waves reflected by moving objects, stationary objects, and the like existing around the vehicle A. The sonar ECU 23 is electrically connected to each sonar sensor 21, and controls the transmission and reception of ultrasonic waves by each sonar sensor 21. The sonar ECU 23 generates detection information indicating relative positions of moving objects and stationary objects existing around the own vehicle based on the received signal of the sonar sensor 21. The sonar ECU 23 successively provides the generated detection information to the parking support ECU 10 through the communication bus 99.

The travelling control system 30 includes multiple vehicle-mounted ECUs and a large number of actuators that control the travelling of the vehicle A. The travelling control system 30 includes a steering control ECU 31, a power control ECU 32, and a brake control ECU 33. The steering control ECU 31, the power control ECU 32, and the brake control ECU 33 each includes, mainly, a microcontroller.

The steering control ECU 31 is an in-vehicle ECU provided in a steering control system of the vehicle A. The steering control ECU 31 controls a direction of the steering wheel thereby controlling a travelling direction of the vehicle A by operating a steering actuator based on the control command transmitted from the parking support ECU 10.

The power control ECU 32 is an in-vehicle ECU that controls a travelling power unit mounted on the vehicle A. The travelling power unit includes at least one of an internal combustion engine and a motor generator. The power control ECU 32 adjusts a travelling speed of the vehicle A in a low speed range by controlling the travelling power unit based on the control command transmitted from the parking support ECU 10.

The brake control ECU 33 is an in-vehicle ECU provided in a brake system of the vehicle A. The brake control ECU 33 controls deceleration and stop of the vehicle A by operating a brake actuator based on the control command transmitted from the parking support ECU 10.

The body ECU 40 is an in-vehicle ECU, and mainly includes a microcontroller. The body ECU 40 is connected to a group of vehicle sensors mounted on the vehicle A. The body ECU 40 transmits output signal from each in-vehicle sensor to the communication bus 99. For example, a steering angle sensor 41 and an autonomous parking start switch (hereinafter referred to as AP switch) 42 are electrically connected to the body ECU 40.

The steering angle sensor 41 is detects a steering state of the steering wheel of the vehicle A. The body ECU 40 outputs steering angle information indicating the angle of steering wheel to the communication bus 99. Herein, the angle of the steering wheel is detected by the steering angle sensor 41.

The AP switch 42 activates the parking support function provided by the parking support ECU 10. For example, the AP switch 42 is installed on an instrument panel or a center console of the vehicle. When the body ECU 40 detects driver's operation input to the AP switch 42, the body ECU 40 outputs the operation information which indicates activation of the parking support function to the parking support ECU 10 through the communication bus 99.

The display audio 50 is one of the display devices mounted on the vehicle A. The display audio 50 has a function of displaying an image generated based on vehicle information, and also has a function of displaying an image input from an external device. The display audio 50 includes a communication interface 51, a touch panel sensor 52, and a display 53.

The communication interface 51 is electrically connected to the communication bus 99. The communication interface 51 receives the vehicle information of the vehicle A output from other devices to the communication bus 99. The touch panel sensor 52 is embedded in a display screen of the display 53, and detects an operation input to the display screen by the driver. For example, when some contents including a peripheral monitoring image AVM are displayed, the driver's operation information detected in response to the driver's operation made on touch panel sensor 52 is output to the communication bus 99 from the communication interface 51, and the driver's operation information is provided to one or more nodes related to the displayed contents.

The display 53 may be a color display which mainly includes a liquid crystal display or an organic light emitting diode (OLED) display. The display 53 may be arranged at a central portion of the instrument panel above the center cluster with the display screen facing a rear direction of the vehicle. The display 53 displays a large number of menu windows, a status window and a setting window of the vehicle A, a television window, an audio window, a map window, and the like, in addition to the above-mentioned peripheral monitoring image AVM.

The camera system 60 includes a front camera 61, a right camera 62, a left camera 63, and a rear camera 64. Each of the cameras 61 to 64 is fixed to the vehicle A and repeatedly captures images of a predetermined range. Each camera 61 to 64 is directly connected to the display control ECU 100 via a image signal line, and the image data generated by image capturing is in a format that conforms to a predetermined moving image format such as NTSC format. The images captured by each camera are successively output to the display control ECU 100.

For example, the front camera 61 is fixed to a center of the front bumper of the vehicle A and captures an image of a front range of the vehicle A. For example, the right camera 62 is fixed to a lower surface of a right side mirror of the vehicle A, and captures an image of a right range of the vehicle A. For example, the left camera 63 is fixed to a lower surface of a left side mirror of the vehicle A, and captures an image of a left range of the vehicle A. For example, the rear camera 64 is fixed to a center of a rear hatch gate or a trunk lid of the vehicle A, and captures an image of a rear range of the vehicle A. The image data of front image, right image, left image, and rear image RV (see FIG. 2) respectively captured by the front, right, left, and rear cameras 61 to 64 are successively input to the display control ECU 100.

The display control ECU 100 is a moving image generation device that generates moving image data of peripheral monitoring image AVM using multiple image data acquired by the cameras 61 to 64 of the camera system 60. The display control ECU 100 controls the display operation of the display 53 by outputting the moving image data of the peripheral monitoring image AVM to the display audio 50. The display control ECU 100 mainly includes a computer which includes processing unit 70, a storage 74, a communication interface 75, an image output interface 76, and the like.

The processing unit 70 is includes a main CPU 71, a graphics display controller (GDC) 72, an image processing application specific integrated circuit (ASIC) 73, and the like. For example, the main CPU 71 is a single-core or double-core general purpose CPU that operates at an operating frequency of 1 GHz to 2 GHz. The main CPU 71 is electrically connected to the RAM. By accessing the RAM, the main CPU 71 executes various processes related to moving image processing. The GDC 72 includes an arithmetic core such as a CPU or a graphics processing unit (GPU), a RAM, a video RAM, and the like. The GDC 72 executes process such as viewpoint conversion and coordinate conversion which are related to the moving image processing. The GDC 72 analyzes the image data captured by each of the cameras 61 to 64 to generate detection information indicating the relative positions of moving objects and stationary objects existing around the vehicle with respect to the own vehicle. The image processing ASIC 73 is a dedicated, that is, special-purpose circuit that processes the image data input from the cameras 61 to 64. The image processing ASIC 73 executes, to the image data, decoding process, synchronization process, image compression process, composition process, and the like. The image processing ASIC 73 also executes a process for superimposing predicted travelling route lines GLr, GLt on the respective images RV, TV as shown in FIG. 2. The superimposing process will be described later in details.

The storage 74 includes a non-volatile storage medium. Various programs including a display control program 110 executed by the processing unit 70 are stored in the storage 12. The communication interface 75 is electrically connected to the communication bus 99. The communication interface transmits and receives information necessary for generating moving image data to and from the communication bus 99. The communication interface 75 successively provides the detection information of the camera system 60 generated by the processing unit 70 to the parking support ECU 10 through the communication bus 99. The image output interface 76 converts the moving image data generated by the processing unit 70 into a digital signal, and transmits the digital signal to the display audio 50 as the image signal.

The following will describe details of the parking support function mainly executed by the parking support ECU 10 with reference to FIG. 1 and FIG. 2.

When the parking support ECU 10 acquires the operation information related to an operation made by the user on the AP switch 42, the parking support ECU 10 activates the parking support function. The parking support ECU 10 automatically controls the steering, throttle, and brake of the vehicle A by the parking support function, moves the vehicle A to a target parking position TPP set by the driver, and stops the vehicle A at the target parking position TPP. In order to execute such parking support, the parking support ECU 10 includes functional units such as an environment recognition unit 81, a route setting unit 82, and a travelling control unit 83. These functional units are implemented by the processing unit 11 executing a parking support program.

Figure 3:
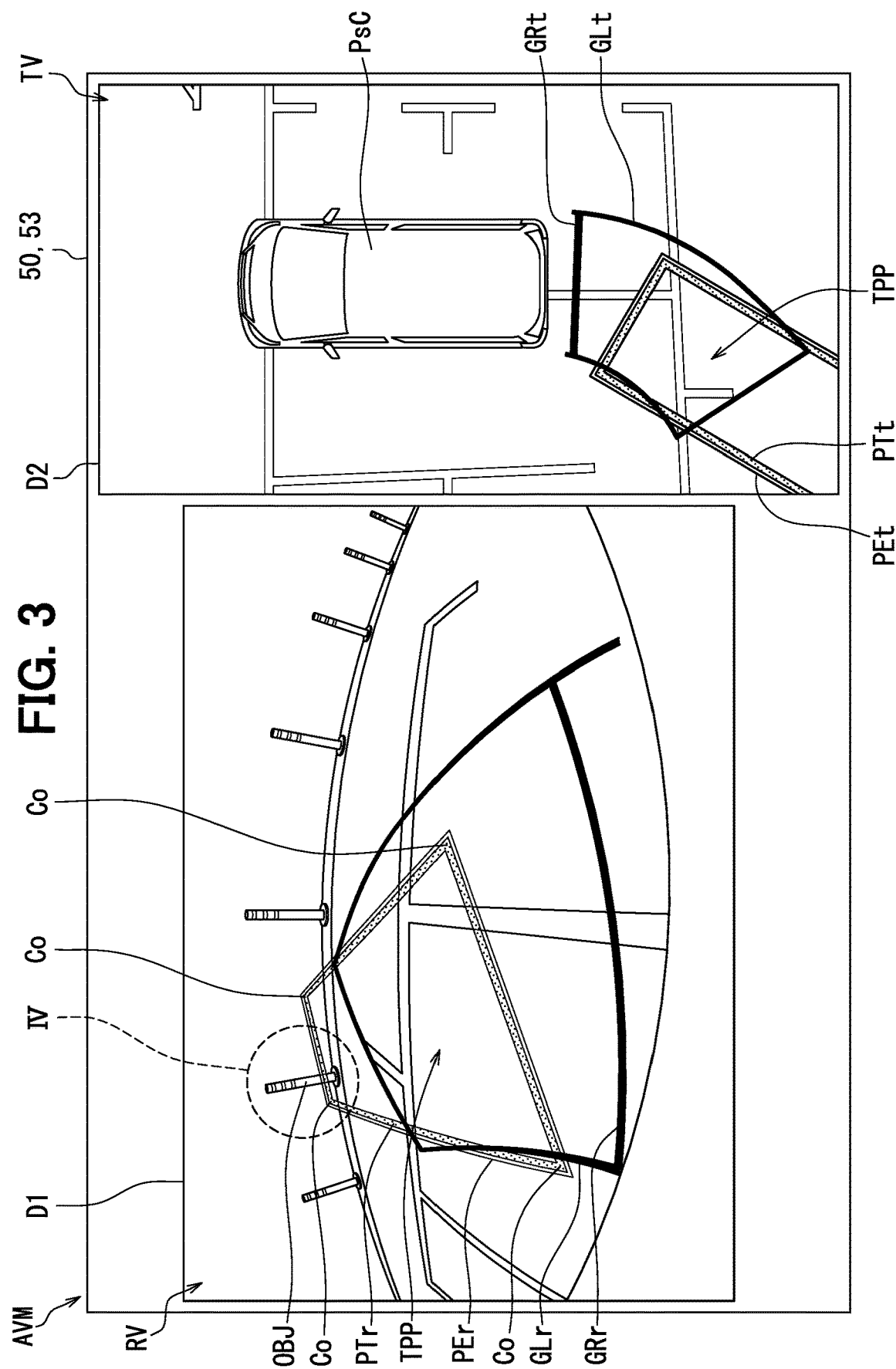
FIG. 3 is a diagram showing a display example in which a target parking frame that is to be overlapped on a rear image is superimposed on a three-dimensional object existing in the rear image.

The environment recognition unit 81 recognizes a travelling environment around the own vehicle based on the detection information of the sonar system 20 and the camera system 60. The environment recognition unit 81 acquires the relative position of the target parking position TPP and the relative position of an obstacle that may hinder a movement of the own vehicle. For example, obstacles recognized by the environment recognition unit 81 may be a pole protruding from a road surface, an adjacent parked vehicle, a pedestrian, and the like. For example, the obstacle such as the pole protruding from the road surface may be displayed as a three-dimensional object OBJ as shown in FIG. 3.

Based on the recognition result by the environment recognition unit 81, the route setting unit 82 generates a travelling route for moving the vehicle A from the current position to the target parking position TPP while avoiding obstacles around the own vehicle. The route setting unit 82 controls the stop and the start of the vehicle A according to the presence or absence of the obstacle on the travelling route recognized by the environment recognition unit 81. For example, the route setting unit 82 temporarily stops the vehicle A when a pedestrian approaches the vicinity of the travelling route.

The travelling control unit 83 generates a control command to be output to the travelling control system 30 based on the travelling route set by the route setting unit 82. The travelling control unit 83 moves the own vehicle toward the target parking position TPP by cooperating with the ECUs 31 to 33 of the travelling control system 30.

When the above parking support function is activated by the parking support ECU 10, the display control ECU 100 generates moving image data of the peripheral monitoring image AVM and starts display of the peripheral monitoring image AVM on the display 53. The following will describe details of the peripheral monitoring image AVM with reference to FIG. 1, FIG. 2, and FIG. 3.

The peripheral monitoring image AVM has two display areas arranged on left side and right side. Among the two display areas, a first display area D1 located close to the driver's seat displays a bird's-eye view image TV. Among the two display areas, a second display area D2 located farther from the driver's seat than the first display area D1 displays a rear image RV indicating a rear area of the vehicle. On the display screen of the display 53, an area of the second display area D2 is larger than an area of the first display area D1. The left-right arrangement, display sizes of the bird's-eye view image TV and the rear image RV and the like may be properly set and changed by a user operation.

The bird's-eye view image TV is obtained by synthesizing the captured image data of each camera 61 to 64 of the camera system 60. The bird's-eye view image TV is vertically long, and displays an image as if looking down from a virtual viewpoint defined above the vehicle A. The top, bottom, left, and right in the bird's-eye view image TV respectively correspond to the front, rear, left, and right of the actual vehicle A. In the bird's-eye view image TV, images obtained by converting viewpoints of the real-time images captured by the cameras 61 to 64 are arranged around an own vehicle image item PsC that indicates the own vehicle.

The bird's-eye view image TV is superimposed with image items such as an predicted travelling route line GLt, a rear end guide line GRt, a target parking frame PTt, and a highlight frame PEt.

The predicted travelling route line GLt is displayed in yellow and has a linear shape. The predicted travelling route line is superimposed on the bird's-eye view image TV in opaque manner. When the vehicle A travels in rear direction, the predicted travelling route line GLt is displayed on a side (lower side) corresponding to the travelling direction, herein rear direction with respect to the own vehicle image item PsC. The predicted travelling route line GLt is displayed slightly outside from the vehicle image item PsC in a width direction of the vehicle image item PsC. The predicted travelling route line GLt successively changes corresponding to the steering angle information acquired by the communication interface 75, that is, the predicted travelling route line GLt successively changes corresponding to the steering angle of the steering wheel. The predicted travelling route line GLt indicates a range within which the vehicle A moves when the current steering angle is maintained.

The rear end guide line GRt is displayed in red and has a linear shape. The rear end guide line GRt is superimposed on the bird's-eye view image TV in opaque manner. The rear end guide line GRt is in parallel with a rear end of the vehicle image item PsC and extends in wide direction of the vehicle. Both ends of the rear end guide line GRt are connected to the predicted travelling route line GLt that extends along the travelling direction of the vehicle. In the bird's-eye view image TV, the rear end guide line GRt is displayed at a position separated from the rear end of the own vehicle by a predetermined distance, for example, about 0.3 meter to 0.5 meter.

The target parking frame PTt is displayed in yellow and has a linear shape. The target parking frame PTt is superimposed on the bird's-eye view image TV in opaque manner. The target parking frame PTt is has a rectangular frame shape slightly larger than the vehicle image item PsC. The target parking frame PTt indicates a target parking position TPP to be set or has been set by the parking support ECU 10. The target parking frame PTt can be moved in the bird's-eye view image TV by a user operation made on the touch panel of the display 53. When parking the own vehicle using the parking support function, the user can set the target parking position TPP by moving the target parking frame PTt on the touch panel of the display 53.

The highlight frame PEt is displayed in white and has a linear shape. The highlight frame PEt is superimposed on the bird's-eye view image TV in opaque manner. The highlight frame PEt is superimposed on a portion of the bird's-eye view image TV which does not overlap with the target parking frame PTt. The highlight frame PEt has a frame shape that entirely surrounds an outer peripheral of the target parking frame PTt. A width of line that configures the highlight frame PEt is narrower than a width of line that configures the target parking frame PTt. For example, the width of line that configures the highlight frame PEt may be about half of the line width of the width of line that configures the target parking frame PTt. The highlight frame PEt is drawn along the target parking frame PTt to emphasize the target parking frame PTt. The highlight frame PEt is drawn so as to be in contact with the target parking frame PTt so as not to remain a gap between the highlight frame PEt and the target parking frame PTt. The highlight frame PEt maintains a relative positional relationship with the target parking frame PTt by moving and deforming together with the target parking frame PTt.

The rear image RV is generated based on the image data of the rear camera 64, and shows the rear view of the own vehicle in real time. The rear image RV is a mirror image in which the left and right sides of the image taken by the rear camera 64 are interchanged. As the rear image RV, the entire range of image data captured by the rear camera 64 may be used, or partial range of image data by cutting out partial imaged data of the entire range captured by the rear camera 64 may be used. The rear image RV may be an image obtained by performing distortion correction or color tone correction to the image data captured by the rear camera 64.

The rear image RV is superimposed with image items such as a predicted travelling route line GLr, a rear end guide line GRr, a target parking frame PTr, and a highlight frame PEr. In the rear image RV, the predicted travelling route line GLr, the rear end guide line GRr, the target parking frame PTr, and the highlight frame PEr respectively correspond to and have substantially the same functions as the predicted travelling route GLt, the rear end guide line GRt, the target parking frame PTt, and the highlight frame PEt of the bird's-eye view image TV.

The predicted travelling route line GLr is drawn in a yellow line similar to the predicted travelling route line GLt. The predicted travelling route line GLr is superimposed on the rear image RV in a translucent or opaque manner. The predicted travelling route line GLr extends rearward (upward on the display screen) from the rear bumper of the own vehicle when displayed in the rear image RV. The predicted travelling route line GLr, together with the predicted travelling route line GLt, successively changes corresponding to the steering angle of the steering wheel. The predicted travel route line GLt indicates a range within which the vehicle A moves when the current steering angle is maintained.

The rear end guide line GRr is drawn in a red line similar to the rear end guide line GRt. The rear end guide line GRr is superimposed on the rear image RV in translucent or opaque manner. The rear end guide line GRr extends in a horizontal direction of the screen in parallel with the rear bumper of the own vehicle shown in the rear image RV, and both ends of the rear end guide line GRr are connected to the predicted travelling route GLr generally extending in the vertical direction of the display screen. Similar to the rear end guide line GRt of the bird's-eye view image TV, the rear end guide line GRr is located in the rear end image RV at a predetermined distance (for example, about 0.3 meter to 0.5 meter) from the rear bumper of the own vehicle.

The target parking frame PTr is drawn in a blue line similar to the target parking frame PTt. The target parking frame PTr is superimposed on the rear image RV in translucent manner. The target parking frame PTr is displayed in the rear image RV in a shape of a rectangular frame which is slightly larger than the size of the own vehicle. Similar to the target parking frame PTt, the target parking frame PTr indicates the target parking position TPP has been set or to be set by the parking support ECU 10, and moves within the rear image RV by a user operation made on the display 53. The target parking frame PTr and the target parking frame PTt can move in linked manner with one another. Therefore, when the user moves the target parking frame PTr in the rear image RV, the movement corresponding to the target parking frame PTr is also made in the target parking frame PTt displayed in the bird's-eye view image TV. Similarly, when the user moves the target parking frame PTt in the bird's-eye view image TV, the movement corresponding to the target parking frame PTt is also made in the target parking frame PTr in the rear image RV.

The highlight frame PEr is drawn in a white line similar to the highlight frame PEt. The highlight frame PEr is drawn in a color different from that of the target parking frame PTr. The highlight frame PEr is superimposed on a portion of the rear image RV which does not overlap with the target parking frame PTr in translucent manner. The highlight frame PEr has a shape that emphasizes at least the four corners Co of the target parking frame PTr, and is displayed in a frame shape that surrounds the entire outer peripheral of the target parking frame PTr in the present embodiment. When only a part of the target parking frame PTr is shown in the rear image RV, the target parking frame PTr has a shape that does not surround the entire circumference of the target parking frame PTr.

In the rear image RV, a width of the line that configures the highlight frame PEr is set to be narrower than a width of the line that configures the target parking frame PTr. The width of the line that configures the highlight frame PEr may be about half of the width of the line that configures the target parking frame PTr. The highlight frame PEr is drawn along the target parking frame PTr to emphasize the target parking frame PTr. The highlight frame PEr is drawn so as to be in contact with the target parking frame PTr so as not to remain a gap between the highlight frame PEr and the target parking frame PTr. The highlight frame PEr maintains a positional relationship with the target parking frame PTr by moving and deforming together with the target parking frame PTr. Therefore, the highlight frame PEr and the highlight frame PEt change in synchronization with one another.

Figure 4:
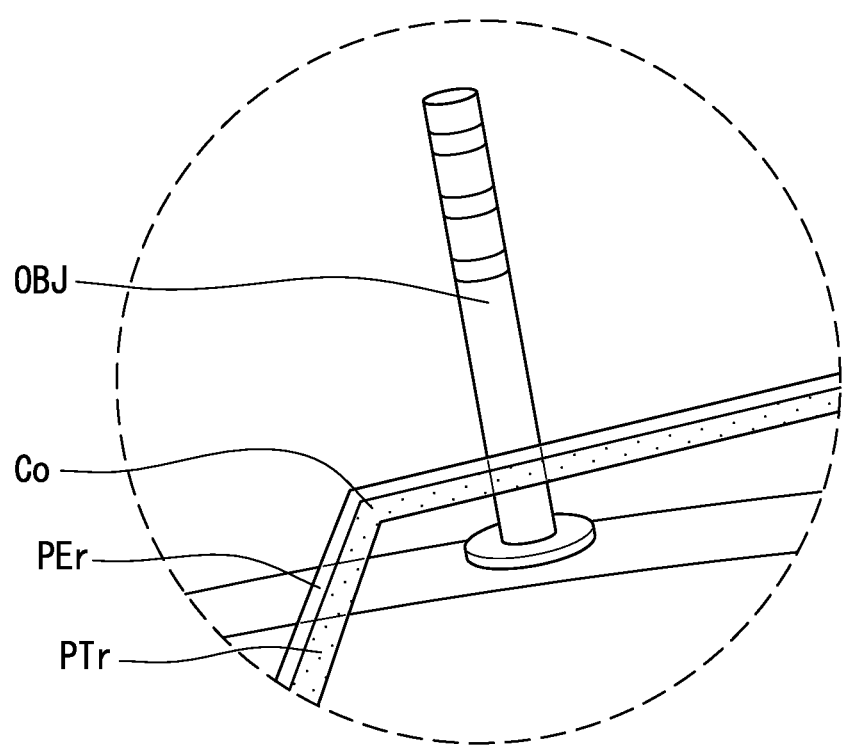
FIG. 4 is an enlarged view of a region IV of FIG. 3 in which the three-dimensional object is overlapped with the target parking frame.

The following will describe details of the display requirements required in a display of the rear image RV captured by the rear camera 64 and details of the display mode, such as the target parking frame PTr for satisfying the display requirements with reference to FIG. 3 and FIG. 4.

In the above-mentioned KT law, a visual confirmation area on a rear side of the vehicle is defined, and it is required that the entire columnar poles existing in the visual confirmation area are required to be visually confirmed by the rear image RV displayed on the display 53. Specifically, the visual confirmation area is defined to be 1.5 meters (5 feet) wide from a center of the rear end of the vehicle A to each of the left and right, and 6 meters (20 feet) rearward from the center of the rear end of the vehicle A. For example, a height of the columnar pole is 80 cm, and a diameter of the pole is 30 cm.

Some columnar poles arranged in the visual confirmation area are required to be shown the entire part of the pole. Therefore, the target parking frame PTr superimposed on the rear image RV is drawn in translucent manner so as not to prevent the entire part of the columnar pole can be seen. Specifically, the target parking frame PTr is drawn with a transmittance of 50% or more, for example, with a transmittance of 70%. According to this configuration, even if the target parking frame PTr overlaps with the columnar pole (for example, three-dimensional object OBJ) shown in the rear image RV during the setting of the target parking position TPP or after the setting of the target parking position TPP, the requirement of "entire part of the pole needs to be visually confirmed" can be satisfied.

However, if the target parking frame PTr is drawn in translucent manner, the visibility of the target parking frame PTr is reduced. Therefore, the highlight frame PEr that emphasizes the target parking frame PTr is displayed on the rear image RV in addition to the target parking frame PTr. Similar to the target parking frame PTr, the highlight frame PEr is also drawn with a transmittance of 50% or more, for example, with a transmittance of 70%. Therefore, even if the highlight frame PEr overlaps with the columnar pole (for example, three-dimensional object OBJ, etc.) shown in the rear image RV, the requirement of "entire part of the pole needs to be visually confirmed" can be satisfied.

Further, the bird's-eye view image TV displayed on the display 53 together with the rear image RV is an image including a display range different from that of the rear image RV. Therefore, the above requirement of KT law about the visual confirmation is not necessarily required to the bird's-eye view image TV. Therefore, the target parking frame PTt and the highlight frame PEt superimposed on the bird's-eye view image TV may be displayed in opaque manner in order to ensure visibility of the frames.

Figure 5:
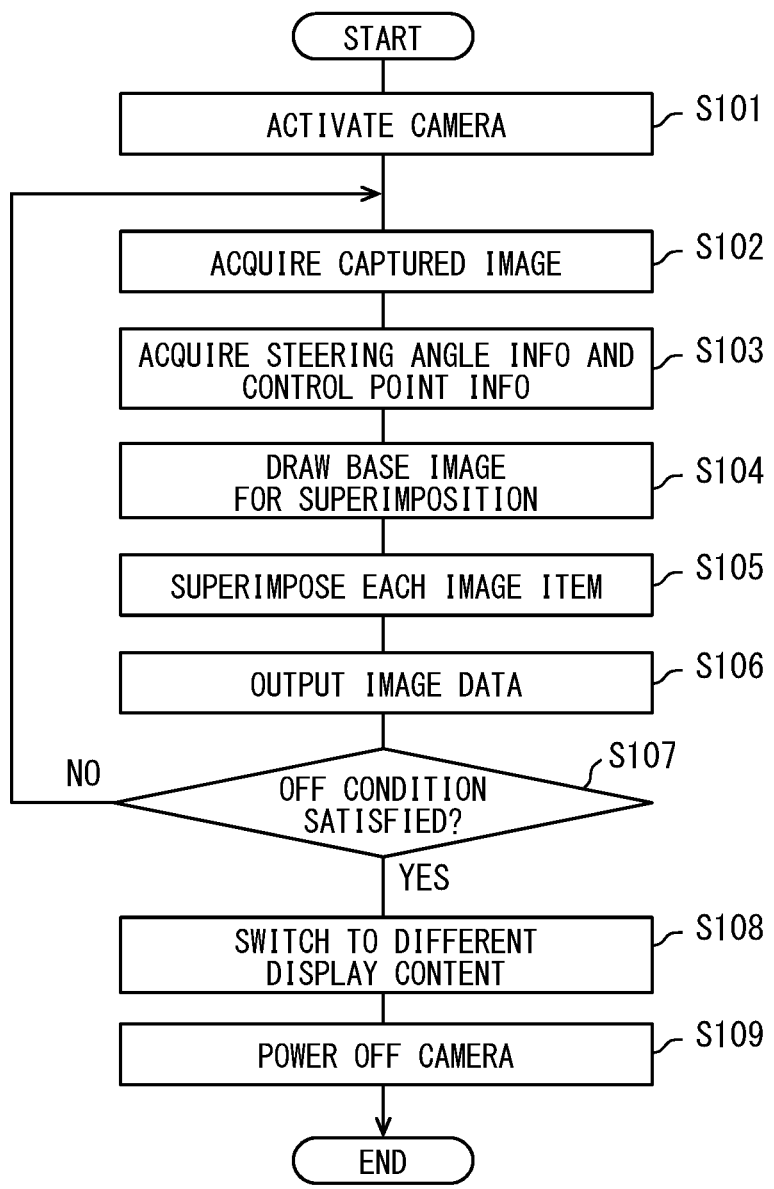
FIG. 5 is a flowchart showing a display control method executed by a display control ECU.

In order to display the peripheral monitoring image AVM including the above rear image RV, the display control ECU 100 executes a display control program 110 using the processing unit 70 to provide functional units including an image acquisition unit 86, an image processing unit 87, and an image output unit 88. The following will describe details of the display control method for displaying the peripheral monitoring image AVM on the display based on the flowchart shown in FIG. 5 with reference to FIG. 3 and FIG. 1. The display control method is implemented by the above-described functional units of the display control ECU 100. The display control process shown in FIG. 5 is executed by the display control ECU 100 that receives the activation notification from the parking support ECU 10 to notify the activation of the parking support function in response to the driver's operation input to the AP switch 42.

In S101, the image acquisition unit 86 activates each camera 61 to 64 by an activation process that outputs an activation signal to the camera system 60. By the camera activation in S101, the output of the image data from each camera 61 to 64 to the image acquisition unit 86 implemented by the image processing ASIC 73 is started.

In S102, the image acquisition unit 86 and the image processing unit 87 perform an acquisition process for acquiring image data transmitted from each of the cameras 61 to 64. The image acquisition unit 86 acquires image data of front image, right image, left image, and rear image RV respectively captured by the front, right, left, and rear cameras 61 to 64 of the camera system 60. The image processing unit 87 applies a mirror image inversion process or the like to the image data of the rear camera 64 to obtain a base image to prepare the rear image RV. When the parking support function is activated by the parking support ECU 10, the image processing unit 87 synthesizes the image data of each camera 61 to 64 acquired by the image acquisition unit 86, and obtains a base image to prepare the bird's-eye view image TV.

In S103, drawing information necessary for drawing each image item is acquired. Specifically, the image processing unit 87 acquires, as drawing information, at least the steering angle information based on the detection of the steering angle sensor 41 and the control information indicating the target parking position TPP. The control information is the position information of the control points indicating the target parking position TPP. The image processing unit 87 acquires the position information of the control points from the parking support ECU 10 to share the relative position information of the target parking position TPP with the parking support ECU 10.

In S104, each image item to be superimposed on the base image is drawn with reference to the drawing information acquired in S103. Specifically, the image processing unit 87 draws the predicted travelling route lines GLr, GLt and the rear end guide lines GRr, GRt based on the preset steering parameters and the latest steering angle information.

The image processing unit 87 draws the target parking frames PTr, PTt and the highlight frames PEr, PEt based on the position information of the control points of the target parking position. At this time, the image processing unit 87 defines a drawing reference line having a predetermined width at a position corresponding to each target parking position TPP in the rear image RV and the bird's-eye view image TV so as to connect the multiple control points. The image processing unit 87 sets an inner portion of the drawing reference line as the target parking frame PTr, PTt, and sets an outer portion of the drawing reference line as the highlight frame PEr, PEt. As described above, the target parking frames PTr, PTt and the highlight frames PEr, PEt having different colors and line widths are drawn in contact with one another without overlapping with one another.

In S105, the image acquisition unit 86 superimposes each image item drawn in S104 on each of the rear image RV and the bird's-eye view image TV. Specifically, the image processing unit 87 superimposes the predicted travelling route line GLr, the rear end guide line GRr, the target parking frame PTr, and the highlight frame PEr on the rear image RV that is prepared as the base image in S102, and generates a processed rear image RV. The image processing unit 87 superimposes the predicted travelling route line GLr, the rear end guide line GRt, the target parking frame PTt, and the highlight frame PEt on the bird's-eye view image TV that is prepared as the base image in S102, and generates a processed bird's-eye view image TV.

In S106, the image processing unit 87 generates the image data of the peripheral monitoring image AVM for output purpose by arranging the processed rear image RV and the processed bird's-eye view image TV generated in S105 in left-to-right direction. Then, the image output unit 88 successively outputs the image data of the peripheral monitoring image AVM generated by the image processing unit 87 to the display 53.

In S107, the display control ECU determines whether an off condition of the peripheral monitoring image AVM is satisfied. For example, the off condition is determined to be satisfied when (i) the movement to the target parking position TPP is completed, (ii) when the driver performs a predetermined driving operation, or (iii) when an off operation is input to the AP switch 42. In response to determining in S107 that the off condition is not satisfied, the process returns to S102 and the generation and output of image data is repeated. In response to determining in S107 that the off condition is satisfied, the process proceeds to S108.

In S108, a notification instructing a display switch from the peripheral monitoring image AVM to another image content is transmitted to the display audio 50. In response to the notification transmitted in S108, the display audio 50 ends the display of the peripheral monitoring image AVM on the display 53. Then, in S109, the image acquisition unit 86 outputs an operation end signal to the camera system 60. By such an operation-off process, the display control ECU 100 powers off each camera 61 to 64 and ends the display control process.

In the above-described present embodiment, the four corners Co of the frame-shaped target parking frame PTr indicating the target parking position TPP are emphasized by the highlight frame PEr. As described above, since the target parking frame PTr is superimposed on the rear image RV in translucent manner, the visibility of the target parking frame PTr is low. According to the present embodiment, the highlight frame PEr displayed in the rear image RV enables the driver to easily find the target parking frame PTr. Therefore, the convenience of the user who needs to visually confirm the rear image RV can be improved.

The highlight frame PEr is drawn in a color different from that of the target parking frame PTr. By drawing the highlight frame PEr in a color different from that of the target parking frame PTr, even if the image capturing environment of the rear image RV changes and the amount of outside light around the vehicle increases or decreases, at least one of the highlight frame PEr or the target parking frame can maintain the state easy to be found by the user. Therefore, the convenience of the user can be ensured.

In the present embodiment, the highlight frame PEr is drawn in white, while the target parking frame PTr is drawn in a color different from white. Specifically, the target parking frame PTr is drawn in blue. When the target parking frame PTr is drawn in a color different from white, the user can easily distinguish the target parking frame PTr from an actual white line indicating parking space displayed in the rear image RV. At this time, since the highlight frame PEr is displayed together with the target parking frame PTr, even though the highlight frame is drawn in white, the highlight frame is unlikely to be mistaken as the actual white line.

For example, when the rear image RV becomes dark and the target parking frame PTr becomes inconspicuous at night, the white highlight frame PEr complements the function of the target parking frame PTr indicating the target parking position TPP. When the amount of external light is small, the actual white line reflected in the rear image RV becomes inconspicuous. Thus, the highlight frame PEr is unlikely to be mistaken as the actual white line displayed in the rear image RV. As described above, the target parking frame PTr and the highlight frame PEr can continue to cooperate with one another to display the target parking position TPP in an easy-to-understand manner even if the image capturing environment of the rear image RV changes.

In the present embodiment, the highlight frame PEr is superimposed on the portion of the rear image RV which does not overlap with the target parking frame PTr in translucent manner. In a configuration where the target parking frame PTr and the highlight frame PEr overlap with one another, even though the two image items are individually displayed in translucent manner, the overlapping portion of the two image items become substantially opaque, and the rear image RV corresponding to the overlapped part may be blocked without being displayed. As an example, even if the transmittance of about 50% is set for both of the target parking frame PTr and the highlight frame PEr, the transmittance of the overlapping portion is about 25%. Thus, by avoiding the overlap of the target parking frame PTr with the highlight frame PEr, a situation where the overlapping portion superimposed on the rear image RV blocks or hinders the visibility of the three-dimensional object OBJ can be avoided with high certainty.

In the present embodiment, the highlight frame PEr is superimposed on the position in contact with the target parking frame PTr in the rear image RV. If there is a gap between the target parking frame PTr and the highlight frame PEr (hereinafter referred to as the gap between the frames), it becomes difficult to smoothly change the width of gap between the frames caused by insufficient resolution of the display 53 and insufficient resolution of the image data depending on the curved shape of the target parking frame PTr. Such a gap between the frames adversely affects the display performance of the rear image RV.

When the inner boundary of the highlight frame PEr is arranged to be in contact with the outer boundary of the target parking frame PTr without the gap between the frames, the deterioration in display performance of the rear image RV caused by the gap between the frames can be avoided. Therefore, the display mode in which the highlight frame PEr and the target parking frame PTr are in contact with one another can contribute to the improvement of the commercial value of the system for displaying the peripheral monitoring image AVM.

In the drawing of the target parking frame PTr and the highlight frame PEr, the image processing unit 87 of the present embodiment defines the drawing reference line having a predetermined width at a position corresponding to the target parking position TPP in the rear image RV. The image processing unit 87 sets the inner portion of the drawing reference line as the target parking frame PTr, and sets the outer portion of the drawing reference line as the highlight frame PEr. According to such a drawing method, the image processing unit 87 has a low calculation load, can avoid overlapping of the target parking frame PTr with the highlight frame PEr, and can accurately draw the target parking frame PTr and the highlight frame PEr in contacted manner. That is, the overlap and separation of the target parking frame PTr and the highlight frame PEr can be avoided with high accuracy. Therefore, it is possible to display the rear image RV having an excellent display performance while satisfying the requirements of the KT law.

In the present embodiment, each of the target parking frame PTr and the highlight frame PEr has a frame shape, and the frame line width of the highlight frame PEr is narrower than the frame line width of the target parking frame PTr. With this configuration, a master-slave relationship between two image items having similar shapes can be clearly shown to the user. Therefore, a situation where the target parking position TPP indicated by the target parking frame PTr becomes difficult to understand due to the additional display of the highlight frame PEr can be avoided.

In the present embodiment, the highlight frame PEr has a shape that entirely surrounds an outer peripheral of the target parking frame PTr. With this configuration, the highlighting effect of the target parking frame PTr by the highlight frame PEr becomes more likely to be exhibited. As a result, the rear image RV can display the target parking position TPP to the user in a more easy-to-understand manner.

In the present embodiment, the bird's-eye view image TV is displayed on the display 53 concurrently with the rear image RV, and the bird's-eye view image TV has an image capturing range different from that of the rear image RV. The frame-shaped target parking frame PTt indicating the target parking position TPP is also displayed in a place corresponding to the target parking position TPP in the bird's-eye view image TV.

As described above, the target parking frame PTt of the bird's-eye view image TV may be superimposed in opaque manner. Such an opaque target parking frame PTt has high visibility and can indicate the target parking position TPP to the user in an easy-to-understand manner. According to this configuration, even if the visual confirmation easiness of the target parking position TPP in the rear image RV is reduced by displaying the target parking frame PTr of the rear image RV in translucent manner, the bird's-eye view image TV displaying the target parking frame PTt in opaque manner can complement the function of the rear image RV. Therefore, the peripheral monitoring image AVM as a whole can help the user to easily recognize the target parking position TPP.

In the present embodiment, the display 53 corresponds to a display device, the target parking frame PTr corresponds to a target image item, the four corners Co of the target parking frame PTr correspond to four corners of the target image item, and the highlight frame PEr corresponds to an emphasized image item. The bird's-eye view image TV corresponds to another image item, the target parking frame PTt corresponds to a different viewpoint image item, and the display control ECU 100 corresponds to the display control device.

Other Embodiments

Although one embodiment of the present disclosure has been described above, the present disclosure is not construed as being limited to the above-mentioned embodiments, and can be applied to various embodiments and combinations within a scope that does not depart from the spirit of the present disclosure.

Figure 6:
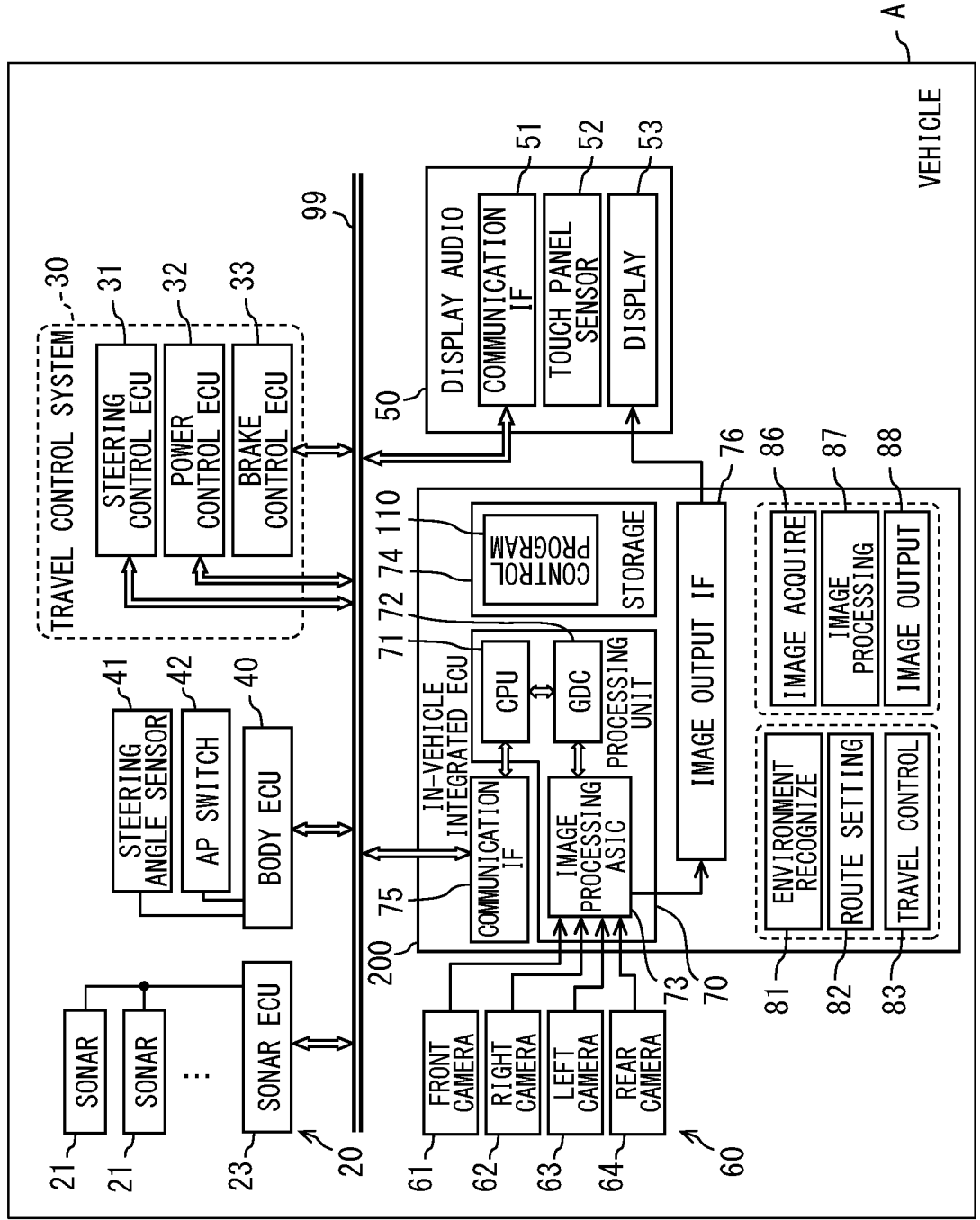
FIG. 6 is a diagram showing a configuration of an in-vehicle network including an in-vehicle ECU according to a first modification of the present disclosure.

A first modification of the above embodiment is shown in FIG. 6. In the first modification, an in-vehicle integrated ECU 200 is provided in the in-vehicle network to include the parking support ECU 10 and the display control ECU 100. The in-vehicle integrated ECU 200 is a high-performance in-vehicle computer including a processing unit 70, a RAM, and a storage 74. The in-vehicle integrated ECU 200 includes, as functional units, an environment recognition unit 81, a route setting unit 82, and a travelling control unit 83 for providing the parking support function by executing the parking support program using the processing unit 70. The in-vehicle integrated ECU 200 further includes, as functional units, an image acquisition unit 86, an image processing unit 87, and an image output unit 88 for displaying the peripheral monitoring image AVM by executing the display control program 110 using the processing unit 70. In this first modification, the in-vehicle integrated ECU 200 corresponds to the display control device.

Figure 7:
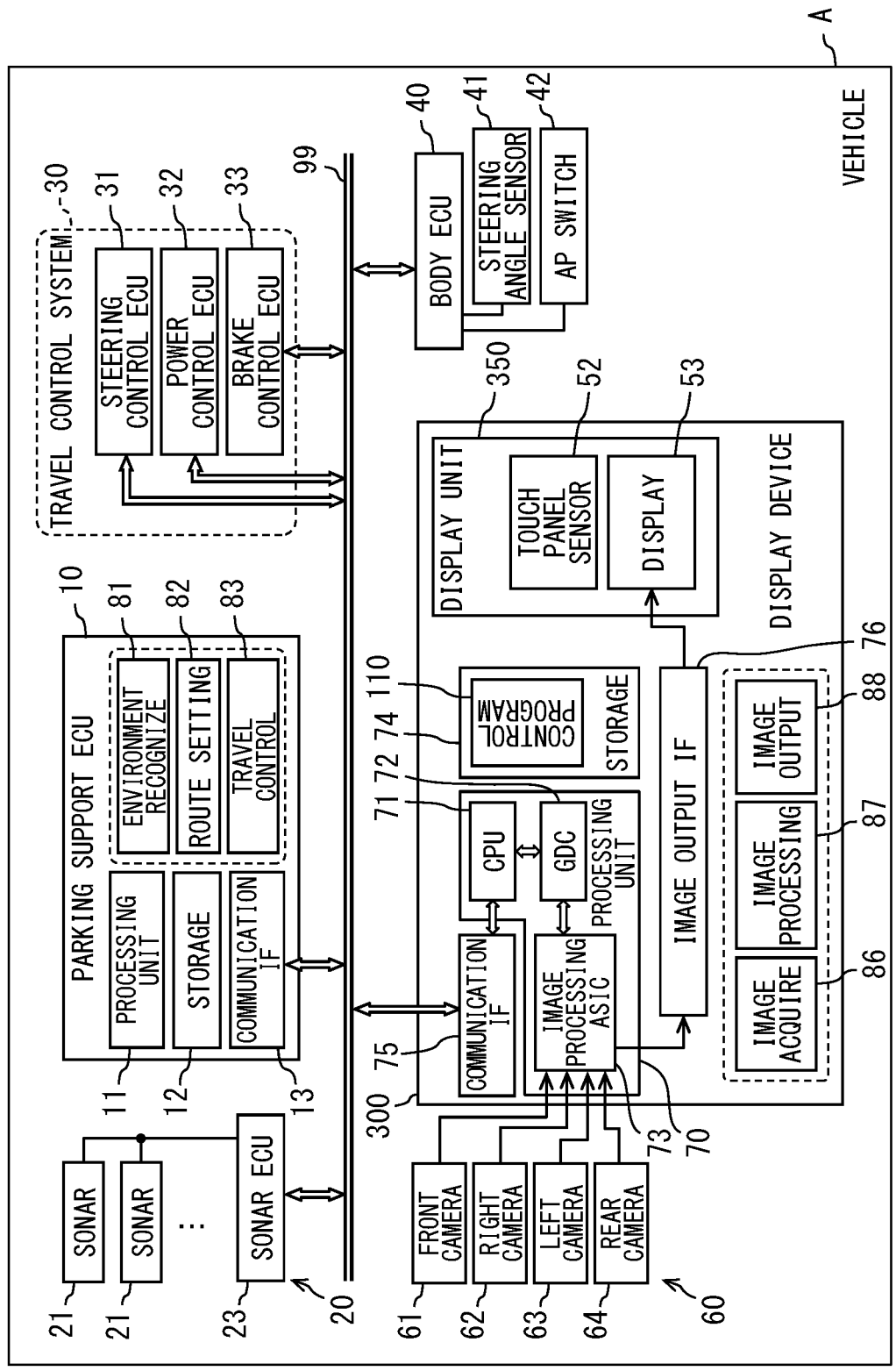
FIG. 7 is a diagram showing a configuration of an in-vehicle network including an display device according to a second modification of the present disclosure.

A second modification of the above embodiment is shown in FIG. 7. In the second modification, a display device 300 is provided in the vehicle-mounted network to include the display control ECU 100 and the display audio 50. The display device 300 includes a display unit 350, the processing unit 70, the RAM, and the storage 74. The display unit 350 includes a touch panel sensor 52 and a display 53. As in the second modification, the function of generating the image data of the peripheral monitoring image AVM may be implemented in a control circuit of the display device 300. In the second modification, the display device 300 corresponds to the display device and the display control device.

Figure 8:
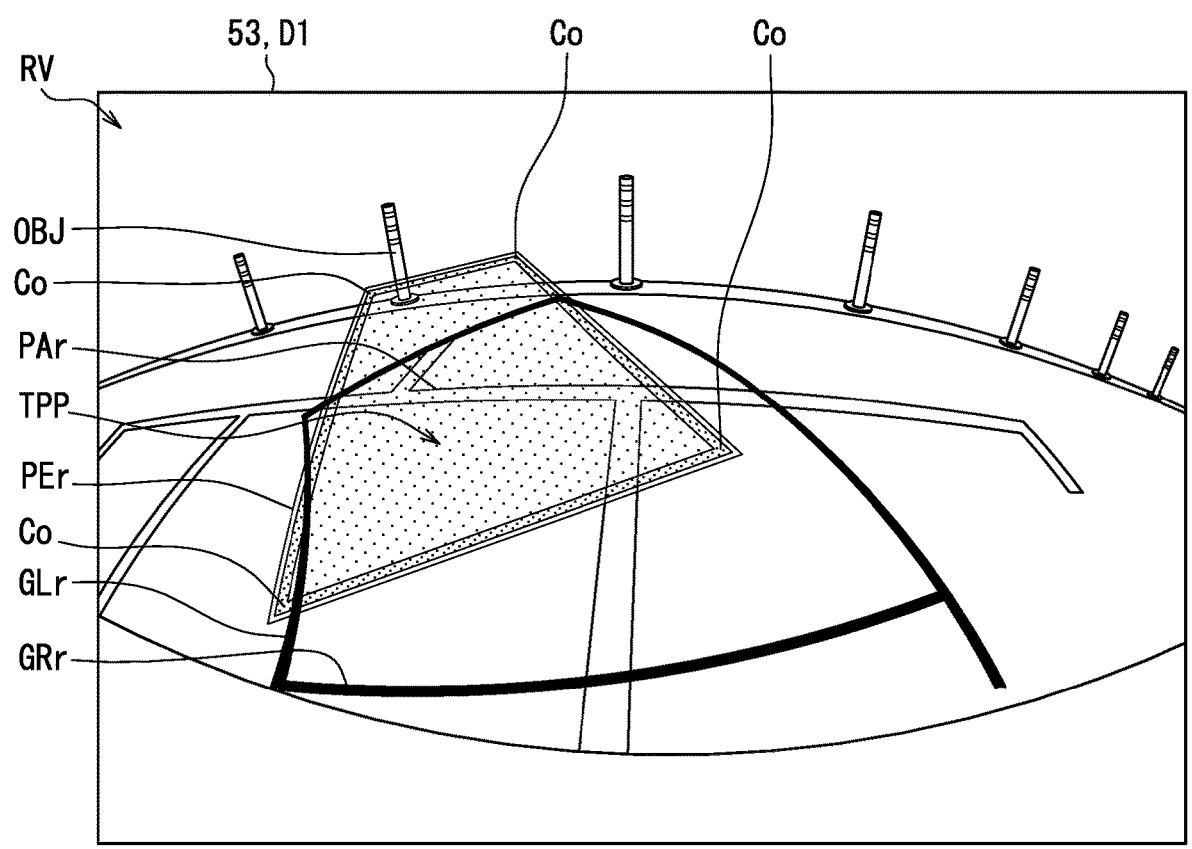
FIG. 8 is a diagram showing a target parking frame and a highlight frame in a rear image according to a third modification of the present disclosure.
Figure 9:
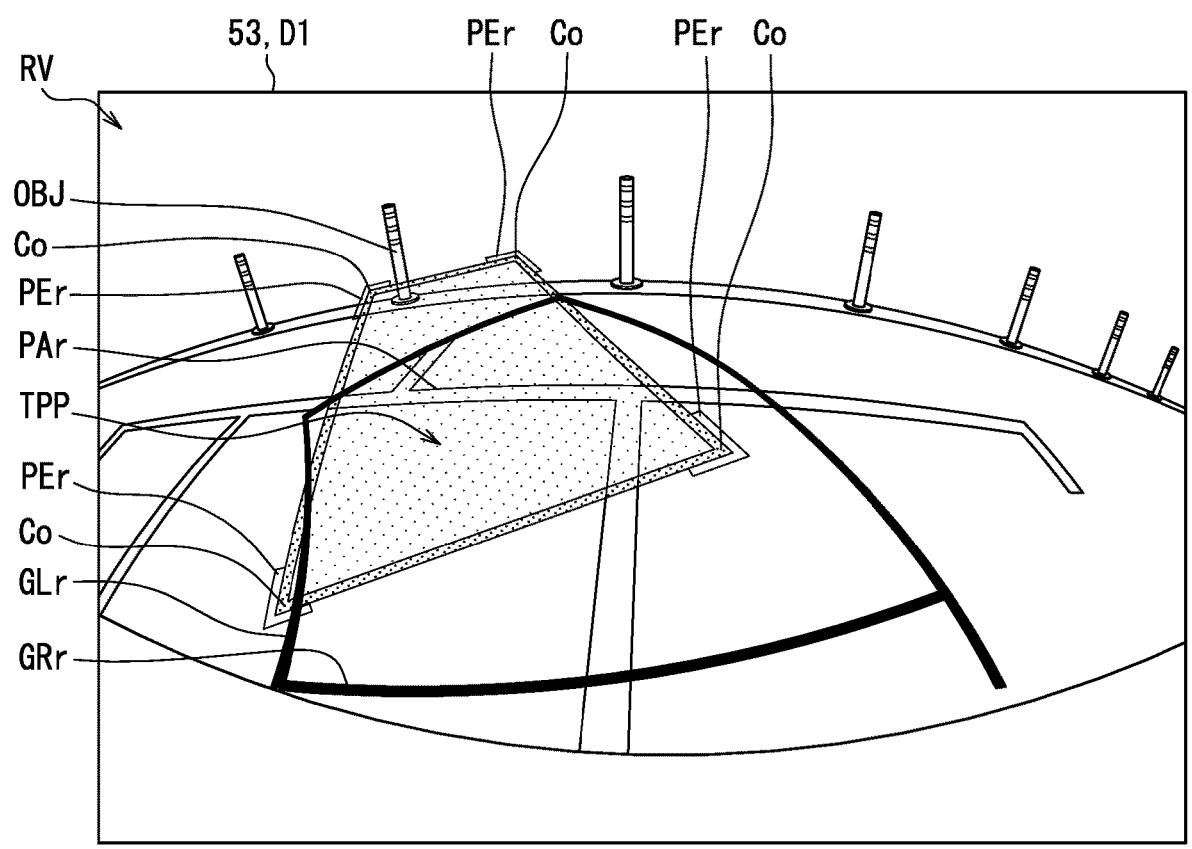
FIG. 9 is a diagram showing a target parking frame and a highlight frame in a rear image according to a fourth modification of the present disclosure.
Figure 10:
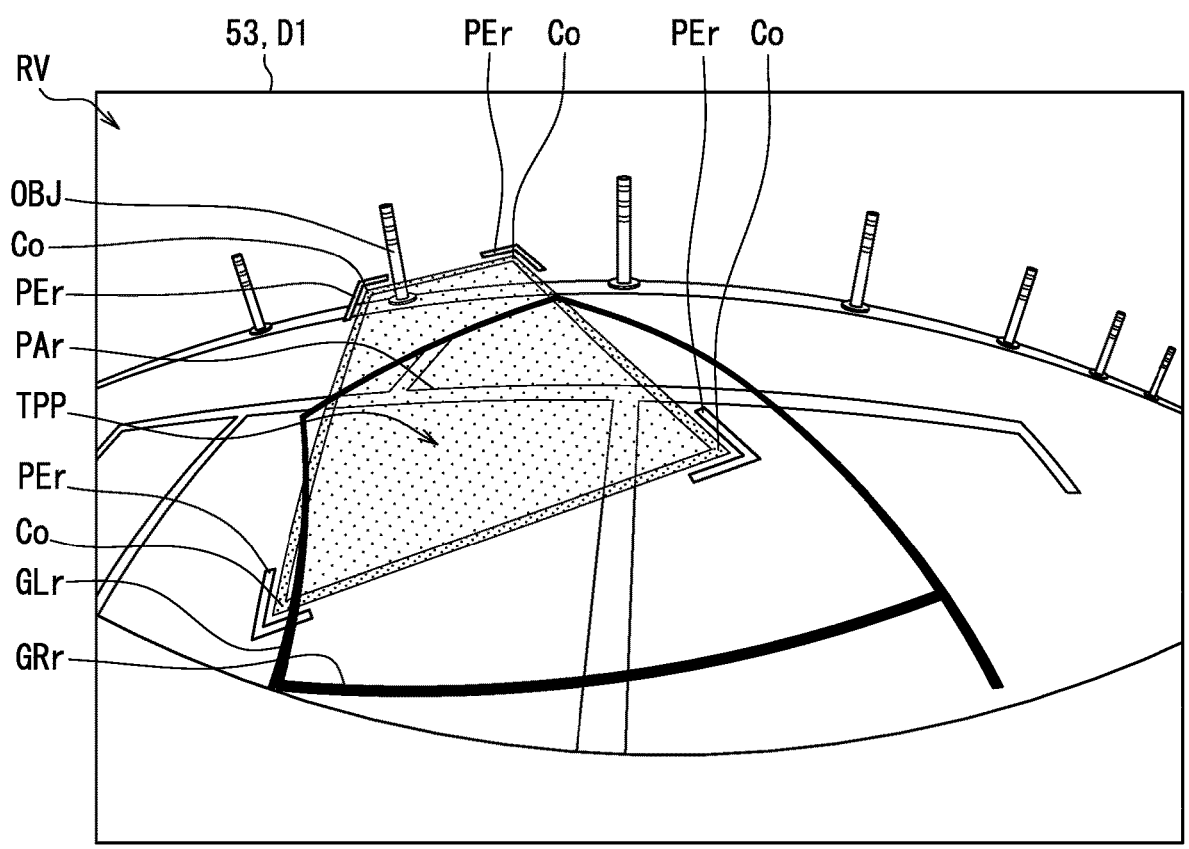
FIG. 10 is a diagram showing a target parking frame and a highlight frame in a rear image according to a fifth modification of the present disclosure.

In the rear image RV of each of third to fifth modification of the above embodiment shown in FIG. 8 to FIG. 10, the display mode of the target parking frame PTr is different from that of the above embodiment. Specifically, in the rear image RV of the third modification shown in FIG. 8, a planar target parking area PAr indicating the target parking position TPP is superimposed on the location corresponding to the target parking position TPP in the rear image RV. The entire target parking area PAr may be superimposed on the rear image RV in opaque manner, similar to the target parking frame PTr of the above embodiment. In the target parking area PAr, a central portion excluding an outer edge portion may have a higher transmittance than that of the outer edge portion. The highlight frame PEr is drawn so as to be in contact with the outer edge portion of the target parking area PAr on outer side and not to overlap with the outer edge portion of the target parking area PAr.

In the rear image RV of the fourth modification shown in FIG. 9, a planar target parking area PAr indicating the target parking position TPP is superimposed on the rear image RV. In the fourth modification, the highlight frame PEr is divided into four segments. Each highlight frame segment PEr has an L shape and is superimposed on the outer portion of each of four corners Co of the target parking area PAr. Each highlight frame segment PEr is drawn so as to be in contact with each corner Co of the target parking area PAr on outer peripheral side and not to overlap with each corner Co.

In the rear image RV of the fifth modification shown in FIG. 10, the planar target parking area PAr indicating the target parking position TPP is superimposed on the rear image RV. In the fifth modification, the highlight frame PEr is divided into four segments, and the four segments are superimposed on the rear image RV in opaque manner. Each highlight frame segment PEr is superimposed at a position slightly distant from each corner Co of the target parking area PAr. As a result, a gap between the frames is formed between each highlight frame segment PEr and each corner Co.

The third to fifth modifications also have the same advantages as those of the above embodiment. In the third to fifth modifications, the target parking area PAr corresponds to the target image item. In the bird's-eye view image TV, the target parking area corresponding to the target parking area PAr is displayed as a different viewpoint image item. In the fourth and fifth modifications, the shape of the highlight frame PEr superimposed on the bird's-eye view image TV may be changed according to the shape of the highlight frame PEr.

In a sixth modification and a seventh modification of the above embodiment, the image processing unit 87 stops display of the highlight frame PEr according to the state of the rear image RV. In the sixth and seventh modifications, when the display of the highlight frame PEr is stopped, the target parking frame PTr may be superimposed in opaque manner.

Specifically, the image processing unit 87 of the sixth modification determines a brightness of the rear image RV. The image processing unit 87 may determine the brightness by comparing an average value of the overall brightness of the rear image RV with a threshold value, or may determine the brightness by comparing a control value (exposure value) of the rear camera 64 with the threshold value. When the image processing unit 87 determines that the rear image RV is dark, the image processing unit 87 superimposes the highlight frame PEr on the rear image RV in addition to the target parking frame PTr. When the image processing unit 87 determines that the rear image is bright (not dark), the highlight frame PEr is not superimposed on the rear image.

The image processing unit 87 in the seventh modification 7 determines presence or absence of the three-dimensional object OBJ as shown in FIG. 3 which is displayed in the rear image RV. When the image processing unit 87 determines that the three-dimensional object OBJ exists in the entire rear image RV or in a specific range of the rear image RV, the highlight frame PEr is superimposed on the rear image RV in addition to the target parking frame PTr. When the image processing unit 87 determines that the three-dimensional object OBJ does not exist in the rear image RV, the highlight frame PEr is not superimposed.

Each of the target parking frame PTr and the highlight frame PEr in the above embodiment does not have to be a strict square shape. For example, the corners Co at the four corners may be provided with corner radius, chamfering, or the like. Further, the transmittance of the target parking frame PTr and the transmittance highlight frame PEr do not have to be the same or substantially the same as one another. For example, the transmittance of the highlight frame PEr may be set to be lower than the transmittance of the target parking frame PTr, or may be set to be higher than the transmittance of the target parking frame PTr. The transmittance of the target parking frame PTr and the transmittance of the highlight frame PEr may be different from one another at each location in the image item. For example, in the rear image RV, in a range for which the requirement of "entire part of the pole needs to be visually confirmed" does not apply, each image item may be superimposed in opaque manner or in translucent manner with a low transmittance.

Colors of the target parking frame PTr and the highlight frame PEr may be changed as appropriate. For example, the target parking frame PTr and the highlight frame PEr may be drawn in the same color. The target parking frame PTr may be drawn in a color other than blue. Since blue is a color that is unlikely to exist in the natural world, it is easy to be distinguished in the rear image RV even displayed in translucent (semi-transparent) manner. Therefore, in the above embodiment, the target parking frame PTr is drawn in blue.

Under a condition that the entire three-dimensional object OBJ is visually confirmed can be maintained, at least a part of the target parking frame PTr may be displayed in overlapped manner with the highlight frame PEr. The method of drawing the target parking frame PTr and the highlight frame PEr may be changed as appropriate. The highlight frame PEr may be drawn with a line width similar to that of the target parking frame PTr, or may be drawn with a line width larger than that of the target parking frame PTr. The shape of the emphasized image item, such as the highlight frame PEr may be appropriately changed under a condition that the four corners of the target parking frame PTr can be displayed in emphasized manner.

The rear image RV of the above embodiment is displayed together with the bird's-eye view image TV. Alternatively, the display of the bird's-eye view image TV may be omitted. In the peripheral monitoring image AVM, the left or right side image or the like may be displayed together with the bird's-eye view image TV instead of the rear image RV. Alternatively, a left or right side image or the like may be displayed as a separate image together with the rear image RV. The target parking frame and the highlight frame superimposed on such a lateral side image may be superimposed in opaque manner or may be superimposed in translucent manner.

The display which displays the rear image RV is not limited to the display 53 described in the above embodiment. For example, a display installed in the combination meter, a head-up display, or the like may display the rear image RV. In the present disclosure, the term "image" includes the moving image and the stationary image.

In the above embodiment, the target parking frame PTr and the highlight frame PEr are displayed in translucent manner during the setting of the target parking position TPP and after the setting of the target parking position TPP. Alternatively, under a condition that the above-described display requirement is satisfied, these image items may be displayed in translucent manner during the setting of the target parking position TPP or after the setting of the target parking position TPP.

In the above embodiment and modifications, the respective functions provided by the display control ECU can be also provided by software and hardware for executing the software, only software, only hardware, and complex combinations of software and hardware. In cases where these functions are provided by electronic circuits as hardware, the respective functions can be also provided by analog circuits or digital circuits which include a large number of logic circuits.

Further, the specific implementation of the storage medium for storing the display control program or the like capable of executing the above-described display control method may be changed as appropriate. For example, the storage medium is not limited to the configuration provided on the circuit board, and may be provided in the form of a memory card or the like. The storage medium may be inserted into a slot portion, and electrically connected to the control circuit of the display control ECU. The storage medium may include an optical disk which forms a source of programs to be copied into a display control ECU, a hard disk drive therefor, and the like.

The vehicle equipped with the parking support ECU and the display control ECU is not limited to a general private car, but may be a rented vehicle, a vehicle for man-driving taxi, a vehicle for sharing vehicle service, a freight vehicle, a bus, or the like. The display control ECU may be mounted on a vehicle dedicated to unmanned driving used for mobility services.

Further, the vehicle equipped with the display control ECU may be a right-hand drive vehicle or a left-hand drive vehicle. Further, the traffic environment in which the vehicle travels may be a traffic environment premised on left-hand traffic, or may be a traffic environment premised on right-hand traffic. Each display of the target parking frame and the highlight frame according to the present disclosure may be appropriately optimized according to Road Traffic Act of each country and region, the steering wheel position of the vehicle, and the like.

The control unit and the method thereof which have been described in the present disclosure may be also implemented by a special purpose computer which includes a processor programmed to execute one or more functions implemented by computer programs. Alternatively, the control unit and the control method described in the present disclosure may be implemented by a special purpose hardware logic circuit. Alternatively, the control unit and the control method described in the present disclosure may be implemented by one or more special purpose computers configured by a combination of a processor executing a computer program and one or more hardware logic circuits. Further, the computer program may be stored in a computer-readable non-transitory tangible storage medium as instructions executed by a computer.

What is claimed is:

1. A display control device mounted on a vehicle installed with a parking support function, the display control device controlling a display mounted on the vehicle to display a rear image captured by a rear camera, the rear camera capturing a rear area of the vehicle, the display control device comprising:
   an image acquisition unit acquiring the rear image captured by the rear camera; and
   an image processing unit superimposing, in response to the parking support function that supports parking of the vehicle at a target parking position being activated, a target image item indicating the target parking position at a predetermined position of the rear image which corresponds to the target parking position, the target image item having a frame shape or a planner shape,
   wherein
   the image processing unit is configured to:
      superimpose at least a part of the target image item in a translucent manner on the rear image;
      superimpose, on the rear image, an emphasized image item that emphasizes at least four corners of the target image item; and
      superimpose the emphasized image item on the rear image in a translucent manner at a position where the emphasized image item does not overlap with the target image item.

2. The display control device according to claim 1, wherein
   the image processing unit draws the emphasized image item with a color different from a color of the target image item.

3. The display control device according to claim 2, wherein
   the image processing unit draws the emphasized image item in white and draws the target image item in a color other than white.

4. The display control device according to claim 1, wherein
   the image processing unit superimposes the emphasized image item on the rear image at a position where the emphasized image item is in contact with the target image item.

5. The display control device according to claim 4, wherein
   the image processing unit defines a drawing reference line having a predetermined width at a position corresponding to the target parking position in the rear image, and
   the image processing unit sets the target image item at an inner portion of the drawing reference line and sets the emphasized image item at an outer portion of the drawing reference line.

6. The display control device according to claim 1, wherein
   each of the target image item and the emphasized image item has a frame shape, and a width of a line that configures the emphasized image item is set to be smaller than a width of a line that configures the target image item.

7. The display control device according to claim 1, wherein
   the emphasized image item has a shape that surrounds an entire outer peripheral of the target image item.

8. The display control device according to claim 1, wherein
   the display control device displays, on the display together with the rear image, a different image having a range different from a range of the rear image,
   the different image and the rear image are arranged in a lateral direction on the display, and
   the image processing unit is configured to:
      superimpose a different viewpoint image item indicating the target parking position at a predetermined position of the different image which corresponds to the target parking position, the different viewpoint image item having a frame shape or a planner shape; and
      display the different viewpoint image item in an opaque manner or display the different viewpoint image item with a transmittance lower than a transmittance of the target image item.

9. A display device mounted on a vehicle installed with a parking support function, the display device displaying a rear image captured by a rear camera, the rear camera capturing a rear area of the vehicle, the display device comprising:
   an image acquisition unit acquiring the rear image captured by the rear camera;
   an image processing unit superimposing, in response to the parking support function that supports parking of the vehicle at a target parking position being activated, a target image item indicating the target parking position at a predetermined position of the rear image which corresponds to the target parking position, the target image item having a frame shape or a planner shape; and
   a display displays the rear image on which the target image item is superimposed,
   wherein
   the image processing unit is configured to:
      superimpose at least a part of the target image item in a translucent manner on the rear image;
      superimpose, on the rear image, an emphasized image item that emphasizes at least four corners of the target image item; and
      superimpose the emphasized image item on the rear image in a translucent manner at a position where the emphasized image item does not overlap with the target image item.

10. A display control program product used in a vehicle installed with a parking support function, the display control program product being stored in a computer-readable non-transitory tangible storage medium as instructions to be executed by at least one processing unit to control a display mounted on the vehicle to display a rear image captured by a rear camera, the instructions comprising:
   acquiring the rear image captured by the rear camera; and
   in response to the parking support function that supports parking of the vehicle at a target parking position being activated, superimposing a target image item and an emphasized image item on the rear image;
   wherein the target image item indicates the target parking position with a frame shape or a planner shape, the target image item is superimposed on the rear image at a position corresponding to the target parking position and at least a part of the target image item is superimposed in a translucent manner on the rear image, and the emphasized image item emphasizes at least four corners of the target image item, the emphasized image item is superimposed on the rear image in a translucent manner at a position where the emphasized image item does not overlap with the target image item.

\* \* \* \* \*